(12) United States Patent
Golshenas et al.

(10) Patent No.: US 10,182,162 B2
(45) Date of Patent: Jan. 15, 2019

(54) METHODS AND SYSTEMS FOR CONTROLLED DISTRIBUTION OF DATA TRANSFER CAPACITY BETWEEN MOBILE DEVICES

(71) Applicant: TerraNet AB, Lund (SE)

(72) Inventors: Ario Golshenas, Malmo (SE); Alexander Bladh, Malmo (SE); Lars Novak, Bjarred (SE)

(73) Assignee: TERRANET AB, Lund (SE)

( * ) Notice: Subject to any disclaimer, the term of this patent is extended or adjusted under 35 U.S.C. 154(b) by 0 days.

(21) Appl. No.: 15/618,520

(22) Filed: Jun. 9, 2017

(65) Prior Publication Data

US 2018/0359369 A1 Dec. 13, 2018

(51) Int. Cl.
*H04W 4/24* (2018.01)
*H04W 72/04* (2009.01)
(Continued)

(52) U.S. Cl.
CPC ...... *H04M 15/8214* (2013.01); *H04B 17/318* (2015.01); *H04L 63/083* (2013.01); *H04L 63/0853* (2013.01); *H04L 67/22* (2013.01); *H04M 15/41* (2013.01); *H04M 15/60* (2013.01); *H04M 15/888* (2013.01); *H04W 4/14* (2013.01); *H04W 4/24* (2013.01); *H04W 4/80* (2018.02);
(Continued)

(58) Field of Classification Search
CPC .. H04M 15/8214; H04M 15/41; H04M 15/60; H04M 15/888; H04B 17/318; H04W 4/80; H04W 4/008; H04W 4/14; H04W 4/24; H04W 8/005; H04W 12/06; H04W 48/20; H04W 64/003; H04W 88/04; H04L 63/083; H04L 63/0853; H04L 67/22

USPC ......................................................... 455/407
See application file for complete search history.

(56) References Cited

U.S. PATENT DOCUMENTS 8,812,688 B2 * 8/2014 Luukkala .............. H04W 76/45
709/227
9,667,809 B1 * 5/2017 L pez Quirarte ...........................
H04M 15/8214
(Continued)

OTHER PUBLICATIONS

International Search Report issued in International Application No. PCT/SE2018/050585 dated Sep. 11, 2018.
(Continued)

*Primary Examiner* — Nathan S Taylor
(74) *Attorney, Agent, or Firm* — Birch, Stewart, Kolasch & Birch, LLP

(57) ABSTRACT

Systems and methods enable distribution of data transfer capacity in a WWAN between mobile devices. The data transfer capacity is given by a data plan for the respective mobile device. The systems and methods register first and second mobile devices with a transaction service as acquirers and providers, respectively, of data transfer capacity. The systems and methods detect when a first mobile device indicates a desire to acquire data transfer capacity, identify one or more second mobile devices that are located within reach for short-range communication with the first mobile device, and connect the first mobile device by short-range communication to one of the second mobile devices such that the first mobile device is tethered to the WWAN by this second mobile device. The systems and methods may also distribute authentication data to enable the first mobile device to be authenticated by the second mobile device.

29 Claims, 9 Drawing Sheets

(51) Int. Cl.
  *H04M 15/00* (2006.01)
  *H04W 8/00* (2009.01)
  *H04B 17/318* (2015.01)
  *H04W 48/20* (2009.01)
  *H04W 4/14* (2009.01)
  *H04W 64/00* (2009.01)
  *H04L 29/08* (2006.01)
  *H04M 15/02* (2006.01)
  *H04W 12/06* (2009.01)
  *H04L 29/06* (2006.01)
  *H04W 4/80* (2018.01)
  *H04W 88/04* (2009.01)

(52) U.S. Cl.
  CPC ........... *H04W 8/005* (2013.01); *H04W 12/06* (2013.01); *H04W 48/20* (2013.01); *H04W 64/003* (2013.01); *H04W 88/04* (2013.01)

(56) References Cited

U.S. PATENT DOCUMENTS

| | | | |
|---|---|---|---|
| 2011/0080900 A1* | 4/2011 | Schlipf | H04W 88/04 370/338 |
| 2012/0143978 A1 | 6/2012 | Coussemaeker et al. | |
| 2012/0176976 A1* | 7/2012 | Wells | H04W 52/0219 370/329 |
| 2012/0278466 A1* | 11/2012 | Jallapelli | H04L 12/6418 709/223 |
| 2013/0316676 A1* | 11/2013 | Nousiainen | H04W 8/18 455/411 |
| 2014/0195654 A1 | 7/2014 | Kiukkonen et al. | |
| 2014/0254499 A1 | 9/2014 | Hassan et al. | |
| 2015/0065085 A1* | 3/2015 | Sheikh Naziruddin | H04M 15/7652 455/406 |
| 2015/0099550 A1* | 4/2015 | Alharayeri | H04W 4/21 455/456.3 |
| 2015/0172925 A1* | 6/2015 | Leppanen | H04W 12/04 726/7 |
| 2016/0261473 A1* | 9/2016 | Gupta | H04W 4/06 |
| 2017/0078922 A1* | 3/2017 | Raleigh | H04W 28/10 |
| 2017/0222822 A1* | 8/2017 | L Pez Quirarte | H04L 12/1403 |

OTHER PUBLICATIONS

Kaushik Bhanu, et al., "Providing service assurance in mobile opportunistic networks", Sep. 2016, pp. 123-130.

* cited by examiner

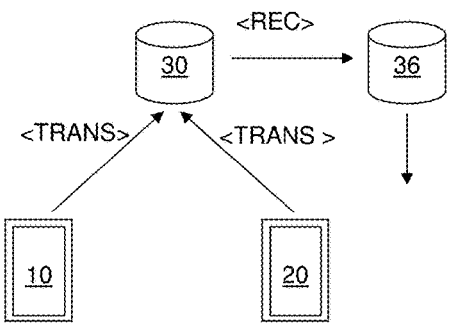
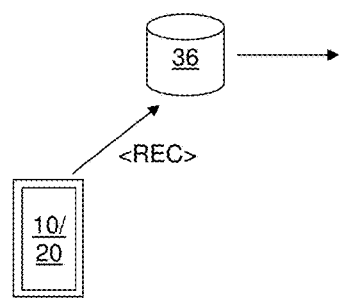
FIG. 10A  FIG. 10B
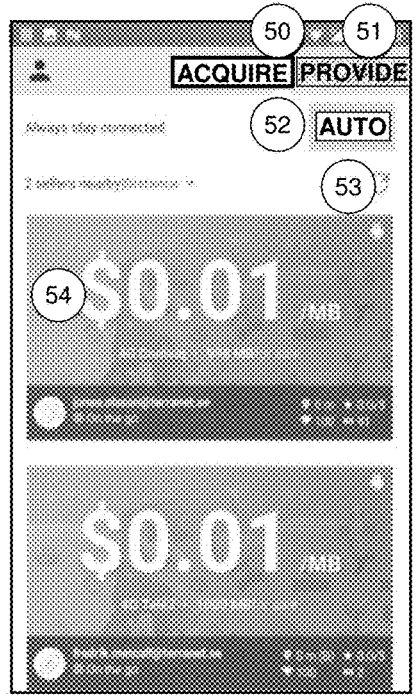
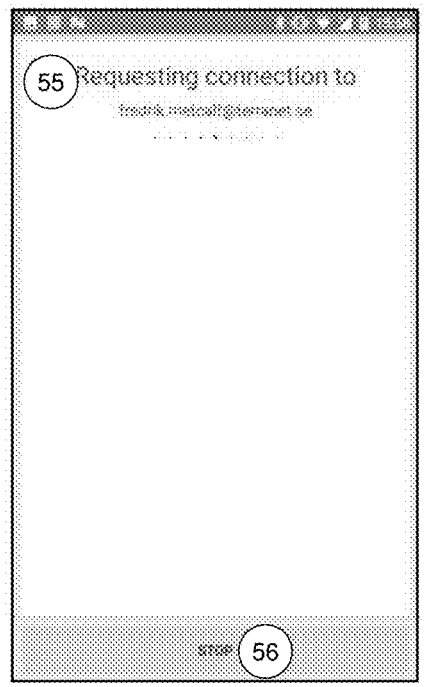
FIG. 11A  FIG. 11B

METHODS AND SYSTEMS FOR CONTROLLED DISTRIBUTION OF DATA TRANSFER CAPACITY BETWEEN MOBILE DEVICES

TECHNICAL FIELD

The present invention relates generally to wireless data communication, and in particular to techniques for distributing data transfer capacity in a wireless wide area network (WWAN) between mobile devices.

BACKGROUND ART

Mobile data demand is being met through a multitude of technologies: wireless wide area networks such as WCDMA and LTE, wireless local area networks such as IEEE 802.11, and wireless personal area networks such as Bluetooth.

Wireless wide area wireless networks are typically accessible to a mobile device if and only if the mobile device has data transfer capacity in the wireless wide area network, given by a "data plan" contract between the user of the mobile device and a network operator. Such a data plan contract may include an unlimited amount of mobile data, but is very often capped to a maximum monthly consumption, measured in megabytes. When the allotted amount of data has been consumed, the user may be offered to purchase additional mobile data from the network operator, causing an undesirable additional higher cost. On the other hand, if a portion of the allotted amount of data has not been consumed within a certain period, usually a month, that portion is forfeited by the user without any compensation by the network operator. Optionally, the network operator might offer the user the possibility to save unused data portions up to a certain limit and for a limited amount of time.

A user may lack a satisfactory Internet connection for several reasons: (i) the user may not have a data plan; (ii) the user may have already consumed his allotted monthly mobile data and is unable or unwilling to purchase additional mobile data from the network operator; (iii) the user may be travelling, having no access to present wide area networks except through roaming, which may be prohibitively expensive; (iv) the user may be connected to a congested wireless local area network.

BRIEF SUMMARY

It is an objective of the invention to at least partly overcome one or more limitations of the prior art.

Another objective is to enable a controlled distribution of data transfer capacity in a wireless wide area network between mobile devices.

A further objective is to enable such a controlled distribution that is partially or completely automated.

One or more of these objectives, as well as further objectives that may appear from the description below, are at least partly achieved by a system, computer implemented methods and non-transient computer-readable mediums according to the independent claims, embodiments thereof being defined by the dependent claims.

A first aspect of the invention is a system for distributing data transfer capacity in a wireless wide area network between mobile devices, said system being configured to: register first mobile devices with a transaction service as acquirers of data transfer capacity in the wireless wide area network; register second mobile devices with the transaction service as providers of data transfer capacity in the wireless wide area network; detect when a first mobile device indicates a desire to acquire data transfer capacity; identify one or more second mobile devices that are located within reach for short-range communication with the first mobile device; and connect the first mobile device by short-range communication to one of the one or more second mobile devices such that the first mobile device is tethered to the wireless wide area network by said one of the one or more second mobile devices.

A second aspect of the invention is a method of distributing data transfer capacity in a wireless wide area network between mobile devices, said method comprising: registering first mobile devices with a transaction service as acquirers of data transfer capacity in the wireless wide area network; registering second mobile devices with the transaction service as providers of data transfer capacity in the wireless wide area network; detecting, by the transaction service, when a first mobile device indicates a desire to acquire data transfer capacity; identifying, by the transaction service, one or more second mobile devices that are located within reach for short-range communication with the first mobile device; and enabling, by the transaction service, the first mobile device to connect by short-range communication to one of the one or more second mobile devices such that the first mobile device is tethered to the wireless wide area network by said one of the one or more second mobile devices.

A third aspect of the invention is a computer-implemented method performed by a software-controlled mobile communication device comprising a transceiver for short-range communication, said method comprising: initiating a search for mobile devices that are registered with a transaction service to provide data transfer capacity in a wireless wide area network and that are located within reach of the transceiver for short-range communication; obtaining authentication data for a selected mobile device among one or more mobile devices detected by the search; and operating the transceiver for short-range communication to establish a connection to the selected mobile device by use of the authentication data and cause the selected mobile device to grant the first mobile device access to the wireless wide area network via the connection.

A fourth aspect of the invention is a non-transient computer-readable medium comprising program instructions that, when executed by a processor in a mobile communication device, causes the processor to perform the method of the third aspect.

A fifth aspect of the invention is a computer-implemented method performed by a software-controlled mobile communication device comprising a first transceiver for communication in a wireless wide area network and a second transceiver for short-range communication, said method comprising: transmitting a connection offer to a transaction server, at which the mobile communication device is registered with a transaction service for providing data transfer capacity in the wireless wide area network; obtaining authentication data; and granting a mobile device, which is authenticated by the authentication data, access to the wireless wide area network via the second transceiver for short-range communication.

A sixth aspect of the invention is a non-transient computer-readable medium comprising program instructions that, when executed by a processor in a mobile communication device, causes the processor to perform the method of the fifth aspect.

A seventh aspect of the invention is a computer-implemented method in a software-controlled server system, said server system operating a transaction service in relation to first mobile devices that are registered for acquiring data transfer capacity in a wireless wide area network and second mobile devices that are registered for providing data transfer capacity in the wireless wide area network, said method comprising: enabling each of the first mobile devices to detect one or more second mobile devices that are located within reach for short-range communication with the first mobile device; enabling transmission to the first mobile device of a connection offer for data transfer capacity by the one or more second mobile devices; and enabling the first mobile device to connect by short-range communication to one of the one or more second mobile devices such that the first mobile device is tethered to the wireless wide area network by said one of the one or more second mobile devices.

An eighth aspect of the invention is a non-transient computer-readable medium comprising program instructions that, when executed by a processor in a computing device, causes the processor to perform the method of the seventh aspect.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIGS. 10A-10B illustrate embodiments for tracking data transfer in the system of FIG. 2.

FIG. 11A-11D are screen views of a GUI on a mobile device operated in accordance with an embodiment.

DETAILED DESCRIPTION OF EXAMPLE EMBODIMENTS

Figure 1A:
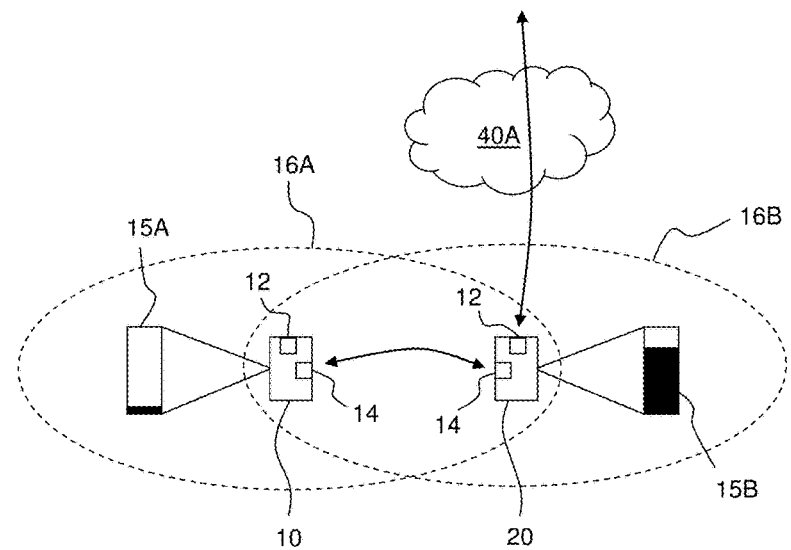
FIG. 1A is a view of mobile devices located in proximity of each other and acting as acquirer and provider of data transfer capacity in accordance with embodiments of the invention.

Embodiments of the present invention will now be described more fully hereinafter with reference to the accompanying drawings, in which some, but not all, embodiments of the invention are shown. Like reference signs refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Embodiments of the invention are directed to methods and systems for controlled distribution of data transfer capacity between mobile devices in a wireless wide area network, specifically by enabling a first mobile device to acquire data transfer capacity of a second mobile device and then communicate in the wireless wide area network through the second mobile device by use of the data transfer capacity. At each time point, the respective mobile device may be configured to act as an acquirer of data transfer capacity or a provider of data transfer capacity, e.g. by user selection. The respective mobile device may be configured as acquirer or provider by a dedicated software application that is executed on the mobile device.

Before describing embodiments of the invention in more detail, a few definitions will be given.

As used herein, a "mobile device" refers to any mobile computing device that is capable of wireless communication. The mobile device may but need not be handheld. Mobile devices include generic mobile devices such as mobile phones, tablets, laptops, wearables, as well as customized mobile computing devices.

As used herein, "data transfer capacity" refers to an amount of data that is allowed for communication in a wireless wide area network. In this context, the data transfer capacity is commonly denoted "bandwidth". The data transfer capacity is given by a data plan, which is an agreement between a network operator, e.g. a mobile network operator (MNO), and a user (subscriber) to specify how much data the user can transfer in the wireless wire area network, e.g. per month, and typically for a specific fee. The data transfer capacity is allocated to a mobile device of the user, e.g. by association with a subscriber identity stored in the mobile device.

As used herein, a "wireless wide area network" or WWAN is given its ordinary meaning and refers to a wireless communication network that covers a large geographic area. As used herein, WWAN typically includes an IP network such as the Internet.

As used herein. "wireless short-range transceiver" is given its ordinary meaning and refers to any wireless communication transceiver that has a limited range when implemented on a mobile device, typically less than approximately 500 m. A wireless short-range transceiver thus implements any available wireless local area network (WLAN) technology and/or wireless personal area network (WPAN) technology, such as communication technology based on the IEEE 802.11 standards, denoted Wi-Fi herein, and Bluetooth communication technology based on any standard specified by Bluetooth SIG.

As used herein, "wireless short-range communication" refers to any form of wireless communication by use of a wireless short-range transceiver.

As used herein, "tethering" is given its ordinary meaning and refers to the sharing of one mobile device's connection to a WWAN with another mobile device such that the former acts as a modem or router for the latter.

As used herein, the term "wireless access point" or WAP is given its ordinary meaning and refers to a configured node on a WLAN or WPAN that allows wireless capable devices to connect through a wireless standard. The WAP is also referred to as "hotspot" herein. A WAP may be "open", whereby the WAP is accessible for data communication by mobile devices, or "secure", whereby the WAP is protected by credentials, such as a PIN or password, which must be supplied to the WAP by a mobile device to be granted access to the WAP for data communication.

As used herein, a "provider" refers to a mobile device that is configured or operable to provide data transfer capacity. The provider may also be designated as a "seller" if the provision of data transfer capacity results in a financial transaction. As a provider, the mobile device comprises both a transceiver for short-range communication and a transceiver for communication in a WWAN. The WWAN transceiver may implement one or more mobile telecommunication cellular network technologies such as LTE, WiMAX, UMTS, WCDMA, HSDPA/HSUPA, CDMA2000, GSM, cellular digital packet data (CDPD), Mobitex, etc.

As used herein, an "acquirer" refers to a mobile device that is configured or operable to acquire data transfer capacity. The acquirer may also be designated as a "buyer" if the acquisition of data transfer capacity results in a financial transaction. As an acquirer, the mobile device comprises a transceiver for wireless short-range communication, and may but need not comprise a WWAN transceiver.

Figure 1B:
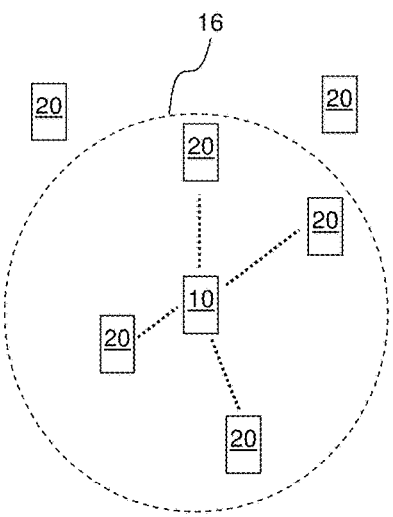
FIG. 1B is a plan view of providers of data transfer capacity located in the environment of an acquirer of data transfer capacity.

FIG. 1A illustrates a first mobile device 10 which comprises a WWAN transceiver 12 for connection to a WWAN 40A. The first mobile device 10 is associated with a data plan 15A for communication in the WWAN 40A. As indicated by the filling level, the data plan 15A is nearly exhausted, which means that the first mobile device 10 soon will be unable to connect to the WWAN 40A by the WWAN transceiver 12. FIG. 1A also shows a second mobile device 20 which comprises a WWAN transceiver 12 and is associated with a data plan 15B that has substantial amount of data transfer capacity left for communication in the WWAN 40A. The first and second mobile devices 10, 20 have a respective transceiver 14 for short-range communication within a respective range 16A, 16B (dashed lines). Embodiments of the invention enable the first mobile device 10 to acquire at least part of the data transfer capacity of the data plan 15B, with the consent of the user of the second mobile device 20, and to cause the second mobile device 20 to tether the first mobile device 10 to the WWAN 40A via a short-range communication channel set up between the transceivers 14, provided that the first mobile device 10 is located within the range 16B of the second mobile device 20 and the second mobile device 20 is located within the range 16A of the first mobile device 10, as indicated in FIG. 1A. It should be realized that any number of second mobile devices 20 may be located within reach for two-way short-range communication with the first mobile device 10. This situation is shown in FIG. 1B, in which a dashed circle 16 is used to generally represent a region that allows for two-way short-range communication between the first mobile device 10 and any number of second mobile devices 20. Embodiments of the invention provide a selection mechanism for the user of the first mobile device 10, or the first mobile device 10 itself, to select a second mobile device 20 among the second mobile devices within the region 16.

As explained in the Background section, there are other situations in which the user of the first mobile device 10 may desire to acquire data transfer capacity from the second mobile device 20 for communicating in the WWAN 40A. In one example, the first mobile device 10 has no data plan 15A, e.g. if the user has travelled to a region in which the first mobile device 10 is not given access to the WWAN 40A except through roaming. In another example, the first mobile device 10 has no WWAN transceiver 12. In yet another example, there may be a substantial amount of data transfer capacity left in the data plan 15A, but the first mobile device 10 has a poor connection to the WWAN 40A by its WWAN transceiver 12.

Figure 2:
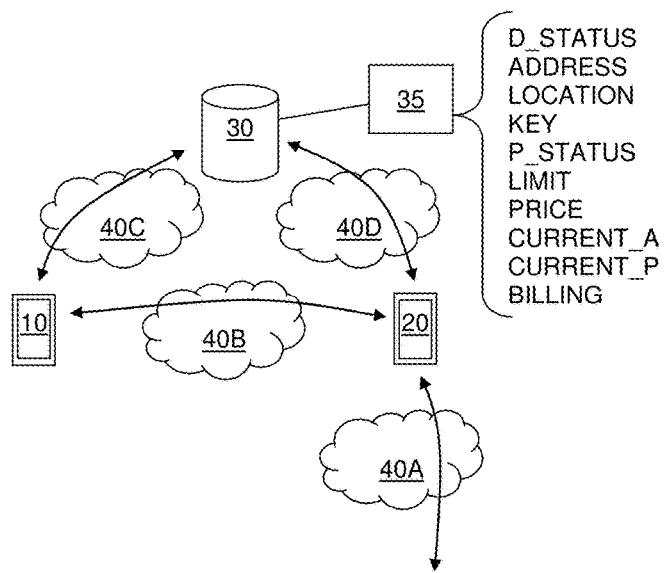
FIG. 2 is an overview of a system according to embodiments of the invention.

FIG. 2 illustrates an embodiment of a system for enabling controlled distribution of data transfer capacity for communication in the WWAN 40A. The system comprises a plurality of first mobile devices 10 (one shown), a plurality of second mobile devices 20 (one shown), and a transaction server 30. Each first mobile device 10 stores a dedicated software program which, when executed by a processor in the first mobile device 10, allows the first mobile device 10 to acquire data transfer capacity for communication in the WWAN 40A. The first mobile devices 10 are denoted "acquirers" in the following. Each second mobile device 20 stores a dedicated software program which, when executed by a processor in the second mobile device 20, allows the second mobile device 20 to provide data transfer capacity, which has been allocated to the second mobile device 20, for communication by a first mobile device 10 in the WWAN 40A. The second mobile devices 20 are denoted "providers" in the following. As indicated in FIG. 2, the acquirers 10 and the providers 20 are operable to communicate with each other over a communication channel in a wireless short-range communication network 40B, which is defined by the above-described short-range transceivers 14. The network 40B may be a peer-to-peer network with a range defined by the transceivers 14. Alternatively, the network 40B may be a wireless mesh network based on short-range communication, which means that the region 16 in FIG. 1B may be extended well beyond the range of the individual transceivers 14.

The transaction server 30 executes a transaction service that enables and coordinates the transaction of data transfer capacity between acquirers 10 and providers 20 in the system, by communicating with the acquirers 10 over a communication network 40C and/or with the providers 20 over a communication network 40D. It should be noted that networks 40A, 40C, 40D may but need not be identical. The acquirers 10 and providers 20 may connect to the respective communication network 40C, 40D by their WWAN transceivers 12. The transaction server 30 may be configured to communicate with the acquirers 10 and providers 20 using any suitable communication protocol.

In embodiments of the invention, the dedicated software application in the mobile devices is configured to allow the user of the respective mobile device to selectively set the mobile device as either an acquirer 10 or a provider 20 in the system.

As will be understood from numerous examples given below, the system may be configured to operate without data transfer on network 40C or network 40D. For example, an acquirer 10 with a depleted data plan, or no data plan at all, may not be able to communicate with the transaction server 30 over network 40C.

The transaction server 30 has access to a database 35, which holds information related to the acquirers 10 and providers 20 in the system. For example, each user and/or mobile device may be represented by a unique identifier (UID), which may be generated by the system or be entered by the user when registering with the system, e.g. a telephone number or an email address. The database 35 may, e.g., associate the unique identifier with one or more system parameters, such as a current device status of the mobile device (D_STATUS), one or more communication addresses to the mobile device in the networks 40B, 40C (ADDRESS), a current geographic location of the mobile device (LOCATION), one or more encryption keys (KEY), a data plan status (P_STATUS), a maximum amount of data transfer capacity to be provided in a current transaction session (LIMIT), a price for provided data transfer capacity (PRICE), current amount of data transfer capacity acquired in a current transaction session (CURRENT_A), a current amount of data transfer capacity provided in a current transaction session (CURRENT_P), billing information (BILLING), etc.

It is realized that certain information in the database 35 may be fixed and entered by the user, e.g. ADDRESS and BILLING. BILLING may indicate if and how the acquirer 10 is to be charged for the acquired data transfer capacity and if and how the provider 20 is to be remunerated for the provided data transfer capacity, etc. Other information in the database 35 may be generated by the server 30, and may be either fixed or intermittently updated, e.g. KEY, which may be used for encrypted data exchange between the server 30 and the respective mobile device 10, 20. Yet other information in the database 35 may be provided by the mobile devices 10, 20, either automatically or on request by the server 30, such as D_STATUS, LOCATION, LIMIT, PRICE, CURRENT_A and CURRENT_P. D_STATUS may indicate the current role of the mobile device in the system, e.g. one of "acquirer", "provider" and "not active". LOCATION may comprise current GPS coordinates of the mobile device and/or a current position identifier of the mobile device in the respective network 40C, 40D. LIMIT and PRICE may be given by a connection offer of the provider 20 and may be reported by the provider 20 to the server 30 or otherwise entered into the database 35 by the user. Alternatively, LIMIT may be predefined by the user or set by the server 30. CURRENT_A may be reported by the acquirer 10 to the server 30, and CURRENT_P may be reported by the provider 20 to the server 30. Yet other information may be retrieved from a network operator database, such as P_STATUS which may indicate the currently available data transfer capacity for the provider 20 according to its data plan.

Figure 3:
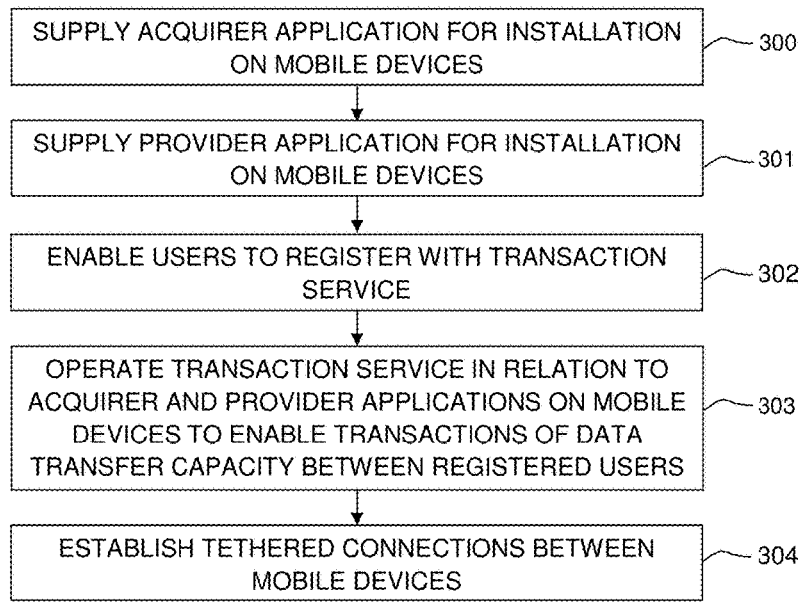
FIG. 3 is a flow chart of a method performed by the system of FIG. 2 according to an embodiment.

FIG. 3 illustrates steps performed by the system in FIG. 2 for enabling the controlled distribution of data transfer capacity.

In step 300, an acquirer application program ("acquirer application") is supplied for installation on mobile devices. When executed, the acquirer application enables the mobile device to operate as an acquirer 10 in the system. In step 301, a provider application program ("provider application") is supplied for installation on mobile devices. When executed, the provider application enables the mobile device to operate as a provider 20 in the system. Steps 300-301 may be executed by the transaction server 30, or by a separate dedicated service, such as Google Play or App Store. For convenience, the acquirer application and the provider application may be integrated as parts of one application program, and steps 300-301 may be performed as a single step.

Step 302 enables users to register with the transaction service provided by the transaction server 30, e.g. through the respective application program on the mobile devices, or through a web page. In the registration process, the user may enter a subscription identifier to identify the data plan and thus the mobile device of the user. In one example, the subscription identifier is a telephone number. The user may also select to be registered as an acquirer, a provider, or both. The user may further select if and how to be remunerated for provided data transfer capacity when operating as a provider 20, and if and how to pay for acquired data transfer capacity when operating as an acquirer 10.

In step 303, the transaction service on the server 30 is operated in relation to acquirer applications and provider applications that are executed on mobile devices in the system to enable transactions of data transfer capacity between registered users of the transaction service.

In step 304, the acquirer and provider applications are operated to establish tethered connections between the mobile devices, i.e. between pairs of acquirers 10 and providers 20. It should be noted, though, that one provider 20 may simultaneously provide tethered connections for more than one acquirer 10.

Figure 4:
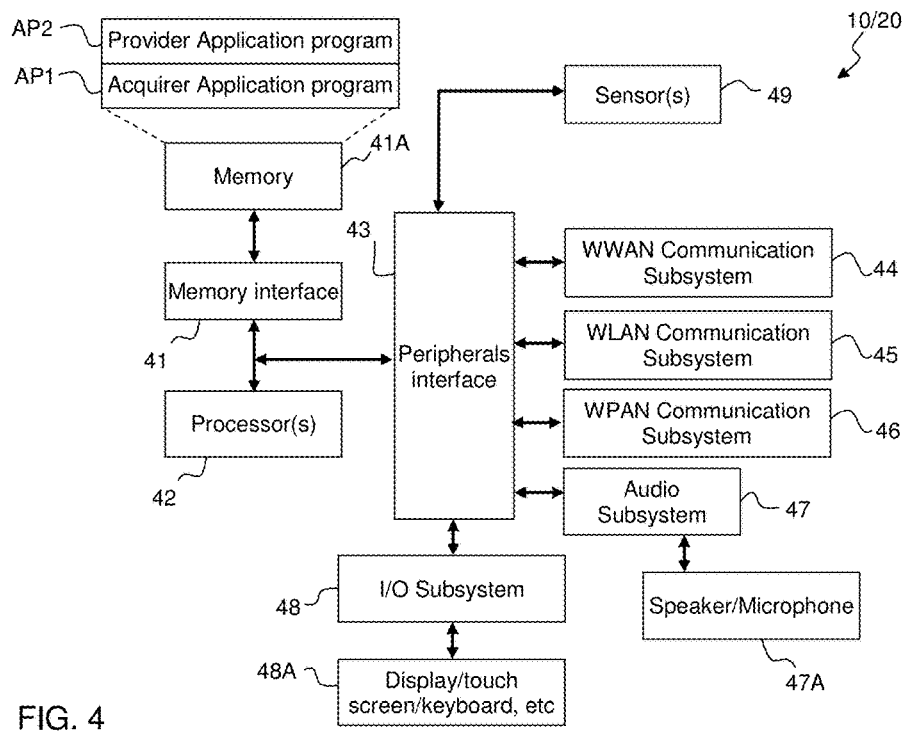
FIG. 4 is a block diagram of an example architecture for the respective mobile device in FIGS. 1-3.

FIG. 4 is a block diagram of an example architecture of the respective mobile device 10, 20 in FIG. 1. The mobile device may include a memory interface 41, one or more processors 42 such as data processors, image processors and/or central processing units, and a peripherals interface 43. The memory interface 41, the processor(s) 42 and/or the peripherals interface 43 may be separate components or integrated in one or more integrated circuits. The various components in the mobile device may be coupled by one or more communication buses or signal lines. Sensors, devices, and subsystems may be coupled to the peripherals interface 43 to facilitate multiple functionalities.

Communication functions may be facilitated through one or more WWAN communication subsystems 44 which may be configured to operate over WWAN networks according to any cellular telecommunications protocol, such as GMS, GPRS, EDGE, UMTS, CDM and LTE, one or more WLAN communication subsystems 45 which may be configured for IEEE 802.11-based communication (Wi-Fi), and one or more WPAN communication subsystems 46 which may be configured for Bluetooth (BT) communication. The subsystems 44-46 include one or more antennas which may be shared between the subsystems or be unique for the respective subsystem. It should be noted that the WWAN transceiver 12 in FIG. 1A may correspond to the subsystem(s) 44, and the transceiver 14 in FIG. 1A may correspond to the subsystem(s) 45 and/or the subsystem(s) 46.

An audio subsystem 47 may be coupled to audio hardware component(s) 47A, such as a loudspeaker and a microphone, to facilitate voice-enabled functions, such as voice recognition, voice replication, digital recording, and telephony functions.

An I/O subsystem 48 may include one or more input/output controllers coupled to input/output hardware component(s) 48A, including but not limited to one or more of a touch screen, a display, a keyboard, a touch pad, one or more buttons, rocker switches, a thumb-wheel, an infrared port, a USB port, and a pointer device such as a stylus. At least part of the I/O subsystem 48 may be operated to generate a graphical user interface (GUI) that presents information to the user and accepts input from the user.

In the example of FIG. 4, one or more auxiliary sensors 49 such as a motion sensor, orientation sensor, proximity sensor, positioning system (e.g., GPS receiver), temperature sensor, biometric sensor, magnetometer, etc, are coupled to the peripherals interface 43 to facilitate related functionalities.

The memory interface 41 may be coupled to a storage memory 41A. The memory 41A may include high-speed random access memory and/or non-volatile memory, such as one or more magnetic disk storage devices, one or more optical storage devices, and/or flash memory (e.g., NAND, NOR). The memory 41A may store an operating system, such as Android, iOS, Windows Mobile, Darwin, RTXC, LINUX, UNIX, or an embedded operating system such as VxWorks. The operating system may include instructions for handling basic system services and for performing hardware dependent tasks. The memory 41A may also store communication instructions to facilitate communicating with one or more external devices, such as servers and other mobile devices. The memory 41A may include graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; and GPS/Navigation instructions to facilitate GPS and navigation-related processes and instructions.

The memory 41A may also store application programs which include any program executable by the processor(s) 42. In some embodiments, certain application programs may be installed on the mobile device by its manufacturer, while other application programs may be installed by a user. As indicated in FIG. 4, at least one of the above-mentioned acquirer application AP1 and provider application AP2 may be stored in the memory 41A. Although not shown in FIG. 4, the memory 41A may also store data related to the execution of the application(s) AP1, AP2, such as the above-mentioned system parameters, e.g. UID, KEY, D_STATUS, LIMIT, CURRENT_A, CURRENT_P, PRICE, as well as other parameters discussed in the following.

Figure 5:
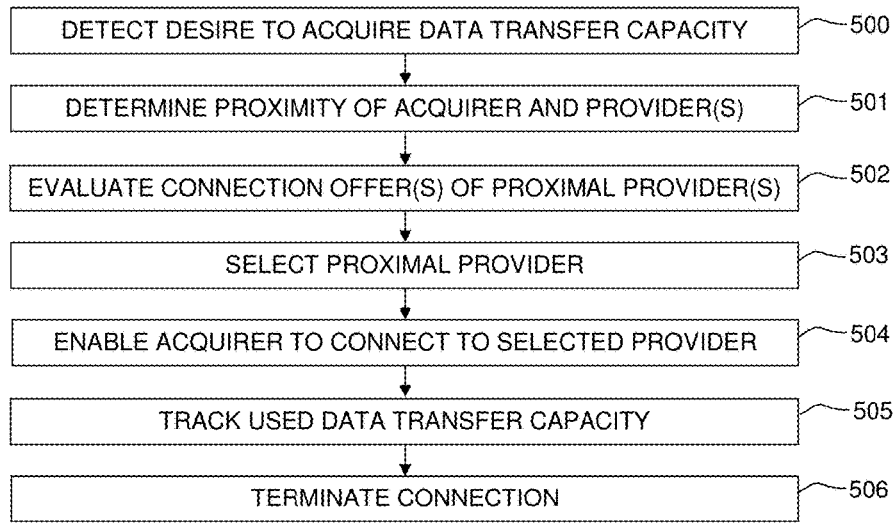
FIG. 5 is a flow chart of a transaction method in the system of FIG. 2 according to an embodiment.

FIG. 5 is a flow chart of a transaction method that is implemented by the system in FIG. 2. The transaction method involves steps that may be executed by the server 30, the acquirer 10 and the provider 20. The system may be configured in many different ways to distribute the execution of steps within the system. Examples will be given further below with reference to FIGS. 6-10 and 12-16.

In step 500, a desire of a specific acquirer 10 to acquire data transfer capacity is detected in the system. In step 501, the system determines proximity between the specific acquirer 10 and one or more providers 2. Referring to FIG. 1B, step 501 may involve identifying the providers 20 (proximal providers) that are located within the region 16 for two-way short-range communication with the specific acquirer 10. In step 502, which is optional, the system evaluates a connection offer of each of the proximal providers 20. In its simplest form, the connection offer may be an indication of a willingness to provide data transfer capacity. However, the connection offer may also include a value of one or more system parameters, e.g. LIMIT and PRICE. LIMIT designates the maximum amount of data that the provider will allow the acquirer 10 to transfer over the tethered connection to the WWAN 40A. PRICE designates the remuneration that the provider requests for the data transfer capacity, e.g. given as a fixed price or a price per data unit (e.g. MB).

In step 503, the system selects a provider among the proximal providers 20. The selection may be made based on system parameter(s) in the connection offer and/or one or more currently measured parameters, such as a signal strength for the connection between the specific acquirer 10 and the respective proximal provider 20, a path quality of a communication path between the specific acquirer 10 and the respective proximal provider 20, a quality of a connection between the respective proximal provider 20 and the WWAN 40A (FIG. 2), a speed of data transfer in the WWAN 40A, etc. The signal strength and path quality may be measured by the specific acquirer 10 and/or the proximal provider 20 in step 501. The quality of the connection may be provided in the system by the proximal provider 20.

The selection in step 503 may be implemented by presenting some or all of the proximal providers 20 to the user on the specific acquirer 10, e.g. on a display, together with values of one or more system parameters and/or measured parameters, and allowing the user to select one of the proximal providers. The selection in step 503 may alternatively be made automatically, by the server 30 or the specific acquirer 10, based on a predefined selection mechanism, which may be at least partly specified by the user of the specific acquirer 10. The predefined selection mechanism may specify an acceptable range for one or more of the system parameters and measured parameters, and an order of priority among the system parameters and measured parameters. For example, the user may set a maximum PRICE and a minimum LIMIT for the selection mechanism, and configured the selection mechanism to prioritize PRICE over LIMIT.

In step 504, the system enables the specific acquirer 10 to connect to the provider 20 that was selected in step 503 so as to establish a tethered connection to the WWAN 40A. Step 504 may cause the provider 20 to set up a wireless access point (WAP) for connection by the acquirer 10. To ensure control of the data transfer capacity that is distributed from the selected provider 20 to the specific acquirer 10, and also to be able to charge the specific acquirer 10 for its actual use of the provided data transfer capacity, step 504 may enable the connection to be acquirer-specific, i.e. only accessible to the specific acquirer 10. In one embodiment, step 504 involves requiring authentication data for establishing the connection and providing the authentication data to the acquirer 10 and the provider 20. For example, step 504 may cause the provider 20 to set up a secure WAP, and the authentication data may include credentials of the secure WAP, such as a password to the secure WAP and an identifier (e.g. SSID) of the secure WAP.

In step 505, while the acquirer 10 is tethered to the WWAN 40A, the system tracks the amount of data transfer capacity that is used by the acquirer 10. The tracked amount may be used for updating the P_STATUS of the provider 20, which may be transferred to the network operator database to ensure that the status of the provider's data plan is up to date. The tracked amount may also be used for charging the acquirer 10 for the transaction and for remunerating the provider 20 for the transaction.

In step 506, the connection between the acquirer 10 and provider 20 is terminated, e.g. by the user manually commanding the acquirer 10 or the provider 20, by the acquirer 10 and the provider 20 moving out of range of each other (cf. FIG. 1B), or automatically when LIMIT has been reached.

The method in FIG. 5 may be fully automated and hidden to the user of the acquirer 10 and the provider 20, or one or more of the steps may be implemented to require user input or user confirmation.

Figure 6A:
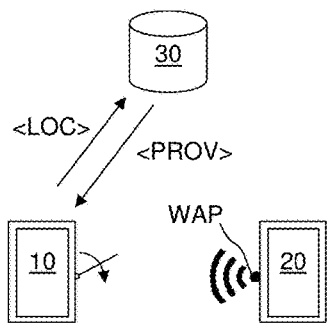
FIGS. 6A-6G illustrate embodiments for determining a proximal provider in the system of FIG. 2.
Figure 6B:
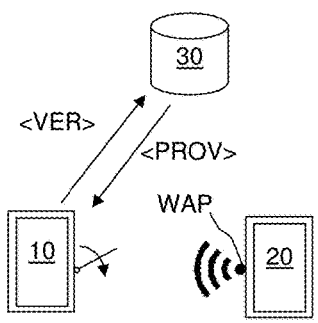
Figure 6C:
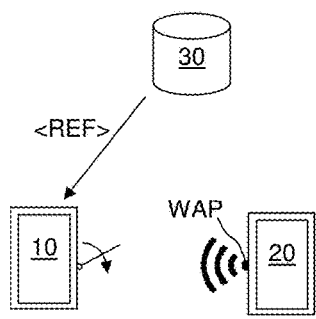

FIGS. 6A-6G show different example embodiments of step 501 in FIG. 5, i.e. proximity determination between a specific acquirer 10 and providers 20 in the system. FIGS. 6A-6C presume that each provider 20 in the system is configured to set up a wireless access point, WAP, with a predefined identifier, e.g. an SSID, that is visible in the network 40B. The respective provider 20 may set up the WAP automatically whenever it is being set to offer data transfer capacity in the system, or upon manual command by the user of the provider 20. The WAP may be set up as an open WAP to allow data exchange between the specific acquirer 10 and the respective provider 20. Otherwise, the WAP may be set up as a secure WAP.

In FIG. 6A, the acquirer 10 transmits a request (<LOC>) to the server 30 for proximal providers. The request may include the current location of the acquirer 10 if not already available to the server 30. The server 30 maps the locations of the providers 20 in the system to an estimated region 16 around the current location of the acquirer 10, and detects the proximal providers 20 that are located within the estimated region 16 (FIG. 1).

As indicated above, the locations may be given by GPS coordinates, which are reported to the server 30 by the acquirers 10 and providers 20 in the system. Alternatively or additionally, the respective location may comprise a position identifier of the acquirers 10 and the providers 20 in the WWAN 40C, 40D, and the region 16 may be given by the position identifier. In a telecommunication network, the position identifier may be a Cell ID, CGI or equivalent. The use of position identifiers has the advantage of reducing power consumption of the acquirers 10 and providers 20, by reducing or eliminating the need for the acquirers 10 and providers 20 to activate their GPS receivers and report GPS coordinates. In a further variant, the respective location may be given by a list of the WAPs (SSIDs) that are within range of the respective acquirer 10 and provider 20, and the server 30 may identify the proximal providers by computing the intersection of acquirer's list and the providers' lists. The lists are reported by the acquirers 10 and providers 20 to the server 30.

The server 30 returns a message (<PROV>) to the acquirer 10 identifying the proximal provider(s) 20. The message may include an identifier (e.g. SSID) of the WAP associated with the respective provider 20 in the network 40B. Based on the message, the acquirer 10 may compile a list of proximal providers 20. Optionally, the acquirer 10 may then operate its transceiver 14 to search for WAPs (as indicated by a scanning symbol in FIG. 6A), so as to ensure that the providers in the list indeed are located within range of the acquirer 10. The acquirer 10 may then update the list by removing the identifiers that were not found in the search.

In FIG. 6B, the acquirer 10 operates its transceiver 14 to search for WAPs, and compiles a list of the proximal providers 20 detected in the search. The acquirer 10 then sends a verification request (<VER>) with the identifiers (SSIDs) of the proximal providers 20 to the server 30, which executes a verification procedure. The verification procedure may involve verifying that the identifiers in the verification request are associated with providers that are registered in the database 35. The verification procedure may also involve verifying that the current locations of the proximal providers that are identified in the verification request are likely to be located within the region 16 around the current location of the acquirer 10. The server 30 returns a verification message (<PROV>) to the acquirer 10 identifying the proximal providers that have passed the verification procedure, and thus are registered providers located in the proximity of the acquirer 10.

In FIG. 6C, the server 30 provides the acquirer 10 with reference data (<REF>) that allows the acquirer 10 to identify the WAPs that belong to registered providers in the system. The acquirer 10 then operates its transceiver 14 to search for WAPs, and compiles a list of the identifiers that match the reference data. The reference data may be provided by the server 30 as a list of identifiers (SSIDs). In an alternative, to reduce the need for storage capacity in the acquirer 10, the respective provider 20 may be preconfigured to set up the WAP with an identifier that belongs to one or more predefined ranges of identifiers that are unique to the system, and the reference data may include the predefined range(s). In another alternative, the respective provider 20 may be preconfigured to set up the WAP with an identifier in a format that is unique to the system, and the reference data may identify the format. In these alternatives, the reference data may be provided by the server 30, at any time, or be integrated in or supplied with the acquirer application AP1. The embodiment in FIG. 6C allows the acquirer 10 to search for and identify providers 20 without having access to the server 30. Thus, an acquirer 10 without a valid data plan or with a data plan that is depleted of data transfer capacity, is still able to detect proximal providers 20 in the system.

Figure 6D:
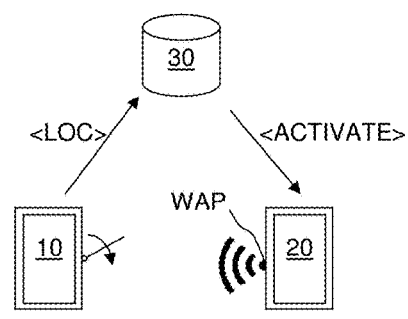

The embodiment in FIG. 6D reduces the power consumption of the providers 20, by reducing the time that the providers 20 need to operate with an activated WAP. Specifically, the acquirer 10 transmits a request (<LOC>) to the server 30 for proximal providers. The request may include the current location of the acquirer 10 if not already available to the server 30. Like in the embodiment of FIG. 6A, the server 30 maps the locations of the providers 20 in the system to an estimated region 16 (FIG. 1B) around the current location of the acquirer 10, and detects one or more proximal providers 20. The server 30 then transmits an activation request (<ACTIVATE>) to the respective proximal provider 20 to temporarily activate its WAP, either for a predefined time period or until the server 30 transmits a deactivation request. The server 30 may also send the above-mentioned verification message (<PROV>) to the acquirer 10. The acquirer 10 then activates its transceiver 14 to search for WAPs. Based on the detected WAPs, the acquirer 10 compiles a list of proximal providers 20. The acquirer may identify providers among the detected WAPs based on the verification message (<PROV>) or by use of the above-mentioned reference data (<REF>). By this embodiment, only the providers 20 that are deemed by the server 30 to be located within range of the acquirer 10 are commanded to activate their WAPs, and only during a limited time period.

Figure 6E:
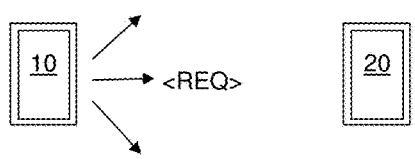

The embodiment in FIG. 6E eliminates the need for the provider 20 to set up an WAP. Instead, the acquirer 10 and the provider 20 are configured with transceivers 12 that enable direct proximity discovery, such as Bluetooth Low Energy (BLE), WiFi Aware or WiFi Direct. In the illustrated example, the acquirer 10 operates its transceiver 14 to broadcast a request that indicates a desire to acquire data transfer capacity. The providers 20 operate their transceivers 14 to intercept requests. Upon intercepting such a request, the respective provider 20 may respond with a message that contains an identifier that allows the acquirer 10 to verify that the message originates from a registered provider in the system, e.g. based on the above-mentioned reference data (<REF>). It should be understood that a reversed embodiment is conceivable, i.e. that the respective provider 20 instead broadcasts a request that indicates a desire to provide data transfer capacity, and that the acquirer 10 operates its transceiver 14 to intercept such requests.

Figure 6F:
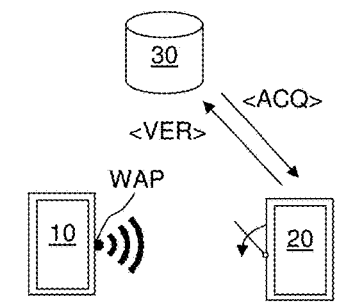
Figure 6G:
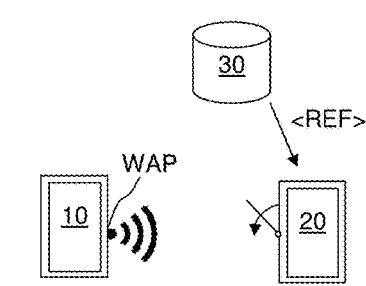

FIGS. 6F-6G are reversed variants of the embodiments in FIGS. 6B-6C. Thus, the actions executed by the acquirer 10 in the embodiment in FIG. 6B are instead executed by the provider 20 in the embodiment in FIG. 6F. Similarly, actions executed by the acquirer 10 in the embodiment in FIG. 6C are instead executed by the provider 20 in the embodiment in FIG. 6G. These reversed variants presume that each acquirer 10 in the system is configured to set up a WAP (open or secure), with a predefined identifier, e.g. an SSID, that is visible in the network 40B. The respective acquirer 10 may set up the WAP automatically whenever it is being set to acquire data transfer capacity in the system, or upon manual command by the user of the acquirer 10.

Figure 7A:
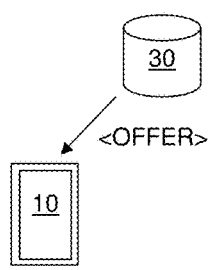
FIGS. 7A-7B illustrate embodiments for providing an offer for data transfer capacity in the system of FIG. 2.
Figure 7B:

As noted above, one or more connection offers of the proximal providers 20 may be evaluated locally by the acquirer 10. FIGS. 7A-7B illustrate example embodiments of how the connection offers (<OFFER>) may be transferred to the acquirer 10 for local evaluation.

In the embodiment of FIG. 7A, the connection offers are provided by the server 30 to the acquirer 10. The connection offers may be predefined and stored in the database 35 (FIG. 2), or they may be communicated from the providers 20 to the server 30 via network 40D, e.g. whenever a user operates the provider 20 to define a new offer or when the provider 20 is set by the user to offer data transfer capacity. The server 30 may provide a connection offer to the acquirer 10 in response to a dedicated offer request from the acquirer 10, where the offer request identifies a proximal provider 20.

Alternatively, the server 30 may provide connection offers together with the verification message (<PROV>, FIGS. 6A-6B). In a variant, the server 30 may provide the connection offers to the acquirer 10 in response to a dedicated offer request from the respective proximal provider 20. Such a variant presumes that the providers 20 are able to determine that they are within range of the acquirer 10, e.g. in the embodiments of FIGS. 6E-6G.

In the embodiment of FIG. 7B, the respective provider 20 transmits a connection offer to the acquirer 10 via the network 40B. For example, in step 501, if an open WAP is set up by the providers 20 (FIGS. 6A-6D) or the acquirers 10 (FIGS. 6F-6G), the connection offer may be communicated over the network 40B. In the embodiment of FIG. 6E, the provider 20 may either broadcast a connection offer for interception by the acquirer 10 or, if a communication channel is set up between the acquirer 10 and the provider 20, transfer the connection offer on the communication channel.

FIGS. 8A-8D show different example embodiments of step 504 in FIG. 5, i.e. for enabling the acquirer 10 to connect to the proximal provider 20 that is selected in step 503. All of the example embodiments involve distribution of authentication data in the form of credentials (<CRED>) that allows only the specific acquirer 10 to connect and tether to the WWAN 40A via the selected provider 20. The credentials may be predefined or generated on-demand in the system. The credentials may include a password or the like (passphrase, PIN, etc). The credentials may further include an identifier of a secure WAP to be set up by the selected provider 20. The secure WAP may be set up according to any encryption standard, such as WPA, WPA2 or WEP. In one example, the identifier is an SSID that is visible in the network 40B. For security reasons, the transmissions of the credentials are preferably encrypted by any suitable encryption technique, symmetric or asymmetric, using encryption keys. In one example, a unique symmetric encryption key may be shared between the server 30 and the respective acquirer 10 and provider 20 in the system. Such an encryption key may be provided together with the acquirer/provider application AP1, AP2, and may be intermittently updated by the server 30 (see FIGS. 12-16 below).

Figure 8A:
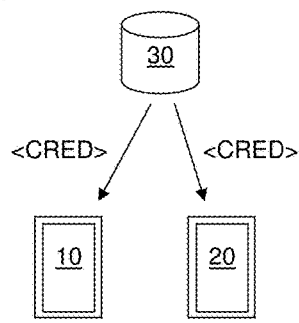
FIGS. 8A-8D illustrate embodiments for distributing credentials in the system of FIG. 2.

In the embodiment of FIG. 8A, the server 30 distributes the credentials to both the acquirer 10 over network 40C and the selected provider 20 over network 40D.

Figure 8B:
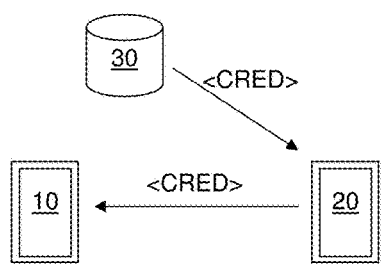

In the embodiment of FIG. 8B, the server 30 transmits the credentials to the selected provider 20 over network 40D, and the selected provider 20 transmits the credentials to the acquirer 10 over network 40B.

Figure 8C:
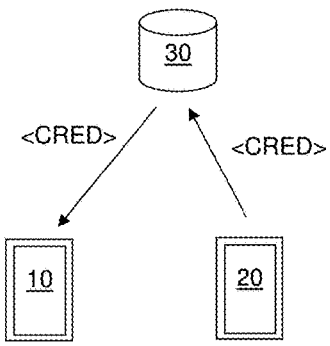

In the embodiment of FIG. 8C, the selected provider 20 transmits the credentials to the server 30 over network 40D, and the server 30 transmits the credentials to the acquirer 10 over network 40C.

Figure 8D:
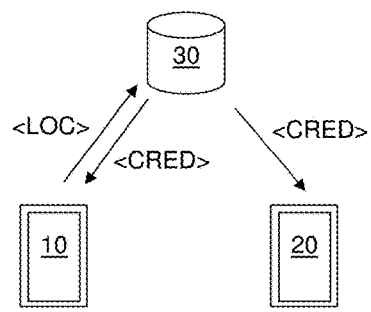

In the embodiment of FIG. 8D, the distribution of credentials is executed by the server 30 as part of the execution of steps 501-504. Specifically, the acquirer 10 transmits a request (<LOC>) to the server 30 for proximal providers (step 501). Like in the embodiment of FIG. 6A, the server 30 detects the providers 20 that are located within an estimated region 16 around a current location of the acquirer 10. However, in contrast to FIG. 6A, the server 30 does not inform the acquirer 10 about the proximal providers 20, but selects one of the proximal providers (step 503), optionally after evaluating the connection offers of the proximal providers (step 502). Then, the server 30 transmits the credentials to the acquirer 10 over network 40C and to the selected provider 20 over network 40D.

Figure 9:
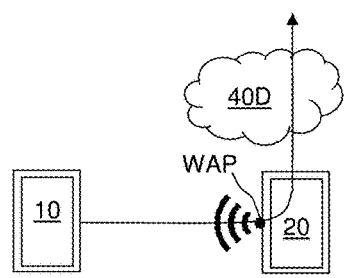
FIG. 9 illustrates an acquirer tethered to a WWAN network by a provider.

FIG. 9 shows an acquirer 10 that has connected to a secure WAP of the selected provider 20 by use of the credentials, e.g. provided in accordance with any one of the embodiments in FIGS. 8A-8D, so as to be tethered to the WWAN 40A. However, as discussed in relation to FIG. 6E, it is conceivable that the acquirer 10 is connected to the selected provider 20 and tethered to the WWAN 40A without the selected provider having to set up a WAP.

FIGS. 10A-10B show different example embodiments of step 505 in FIG. 5, i.e. for tracking the amount of data transfer capacity that has been acquired/provided during the transaction session, i.e. during execution of steps 500-505 for the specific acquirer 10.

In the embodiment of FIG. 10A, the acquirer 10 and the provider 20 separately monitor the amount of data transfer over the tethered connection. The monitored amount is included in transaction reports (<TRANS>) that are transmitted from the acquirer 10 and the provider 20 to the server 30. The transaction reports may be transmitted when the transaction session is terminated (step 506) or intermittently while the acquirer 10 is tethered to the WWAN 40A. The server 30 separately tracks the amount of provided data transfer capacity reported by the provider 20 (CURRENT_P) and the amount of acquired data transfer capacity reported by the acquirer 10 (CURRENT_A). By comparing these tracked amounts, the server 30 may detect attempts of fraud. If the tracked amounts differ, the server 30 may instruct the acquirer 10 and/or provider 20 to terminate the transaction. The tracked amounts for each transaction session may also be stored in the database 35 to settle future disagreements between acquirers and providers on the amount of data transfer capacity that was actually distributed between the provider and the acquirer. The server 30 may further maintain a transaction record (<REC>) for each user in the system, where the transaction record represents the sum of charges for acquired data transfer capacity and revenues for provided data transfer capacity in respect of the user. As indicated in FIG. 10A, the server 30 may transfer the transaction record (<REC>) to a billing server 36 that bills or remunerates the user accordingly.

In the example embodiment of FIG. 10B, the transaction record (<REC>) is prepared by the individual mobile device, which may be switched between acting as an acquirer 10 and a provider 20 in the system, and is transmitted to the billing server 36.

In an alternative embodiment, the system does not charge the acquirers or remunerate the providers for the transaction service.

In a further alternative embodiment, the system charges the acquirers 10 and remunerates the providers 20 in terms of credits that are valid as currency within the system. Thus, a user with a mobile device that can be switched between acting as an acquirer 10 and a provider 20 may earn credits as a provider 20 and spend the credits as an acquirer 10. The available amount of credits may be shown to the user on the mobile device.

FIGS. 11A-11D show example screens of a GUI generated by an application program that combines the above-mentioned acquirer and provider applications AP1, AP2 and is executed on a mobile device. In the illustrated example, the GUI is provided on a touch screen of the mobile device.

FIG. 11A shows an acquirer screen defined by the acquirer application AP1. The user enters the acquirer screen by selecting an acquire button 50. The user is also given the option of switching to a provider screen of the provider application by selecting a provide button 51. The acquirer screen comprises an auto button 52, which may be selected by the user to set the system, when the mobile device operates as an acquirer, to automatically determine proximal providers, select a proximal provider according to the above-mentioned predefined selection mechanism, and establish the tethered connection to the selected provider. This auto state may be useful to ensure that the acquirer quickly establishes a new tethered connection when a current tethered connection is lost. A refresh button 53 is provided to allow the user to manually command the system to search for providers and display a resulting list of proximal providers (here represented by the email address of the registered user) together with further parameter values. In the illustrated example, these further parameter values include the offered price (PRICE), the maximum amount of data transfer capacity to be provided (LIMIT), and an estimated distance to the proximal provider. The user may select a desired proximal provider by clicking on the proximal provider in the list, thereby initiating an attempt to establish the tethered connection through the selected provider.

FIG. 11B shows a connection screen that is displayed while the system attempts to establish the tethered connection via the selected provider. The current status is displayed in a panel 55, and the user is given the option of aborting the connection attempt by selecting a stop button 56.

Figure 11C:
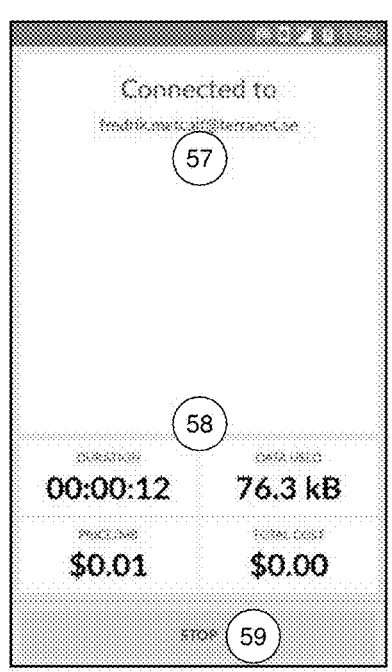

FIG. 11C shows a connected screen that is displayed when the tethered connection has been established by the selected provider. The email address of the selected provider is displayed in panel 57, and the connected screen further includes panels 58 that present the duration of the current transaction session, the amount of data that has been transferred via the tethered connection (CURRENT_A), the price (PRICE), and the current total cost of the transaction session. The tethered connection may be terminated by the user selecting a stop button 59.

Figure 11D:
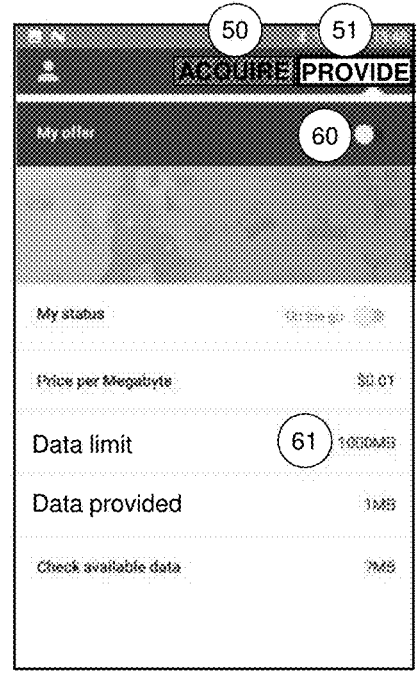

FIG. 11D shows a provider screen defined by the provider application. The user enters the provider screen by selecting the provide button 51. The provider screen comprises a toggle switch 60 that allows the user to switch between publishing and revoking an offer. When the offer is published, the mobile device is a provider in the system. When the offer is revoked, the mobile device is no longer a provider. The provider screen further includes a list 61 of clickable items that represent the offer and the status of the current transaction session. The user may set parameters of the offer, e.g. price and data limit, by clicking on the corresponding item, provided that the offer is not published. For example, by clicking on the data limit, the user may be given the option to set the data limit by moving a slider, where the position of the slider is associated with different fractions of the total data transfer capacity that is currently allowed by the data plan. In the example of FIG. 11D, the list 61 also includes an item that indicates the current amount of data transfer capacity provided in the current transaction session (CURRENT_P), and an item that allows the user to check the current status of the data plan allocated to the mobile device.

FIGS. 12-16 are sequence diagrams for a few different embodiments of the method executed by the system in FIG. 2 to distribute data transfer capacity. In FIGS. 12-16 and the related description, acquirers 10 are denoted "buyers" and providers 20 are denoted "sellers".

Figure 12:
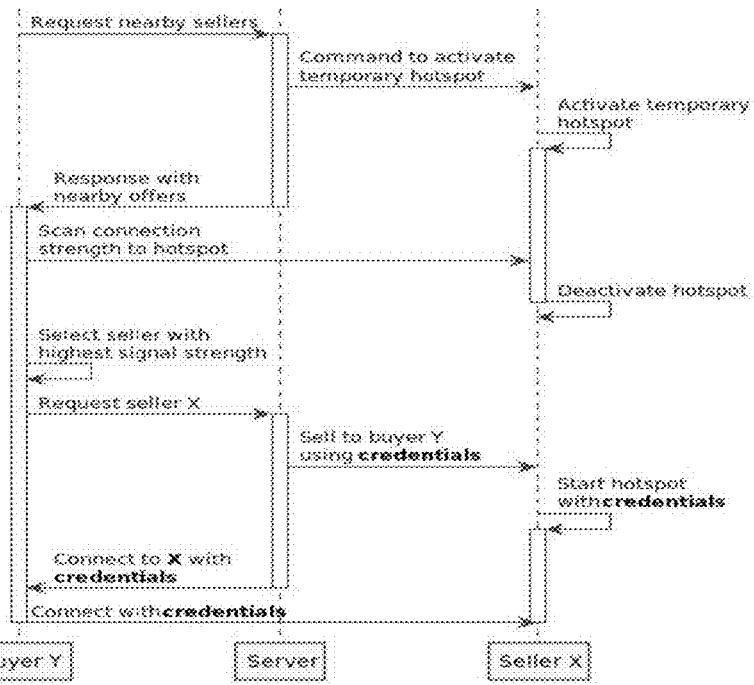
FIGS. 12-16 are node sequence diagrams for embodiments of the transaction method in FIG. 5.

The method in FIG. 12 corresponds to a combination of the processes in FIG. 6D, FIG. 7A and FIG. 8A. The method presumes that the buyer 10 is able to connect to the transaction server 30 via the WWAN network 40C by use of its data plan, i.e. which is thus not completely depleted. The sequence of steps in FIG. 12 starts by buyer Y transmitting, over network 40C, a request to the transaction server for the nearby sellers. The server identifiers nearby sellers ("proximal providers"), including seller X, and sends an activation request, over network 40D, to each seller to activate a temporary hotspot. When receiving the activation request, the respective seller operates its transceiver 14 to activate the temporary hotspot with a respective unique SSID that is recognized by the buyers as belonging to the system. The server also transmits a response to buyer Y with connection offers of the nearby sellers, including the connection offer of seller X. The connection offers may be pre-stored at the server (in database 35), or communicated by the sellers to the server in response to the activation request. After receiving the response, buyer Y operates its transceiver 14 to search for hotspots belonging to the system and may also determine the signal strength of the respective hotspot. After a predetermined time period, the sellers deactivate their respective temporary hotspot. Buyer Y selects one of the sellers, here seller X, based on the above-mentioned predefined selection mechanism or user selection. In the illustrated example, the seller with the highest signal strength of its hotspot is selected. Buyer Y then transmits, over network 40C, a connection request for seller X to the server. After receiving the connection request, the server obtains (e.g. generates on demand) credentials for the connection between seller X and buyer Y. The credentials include an SSID and a password. The server transmits a first transaction request with the credentials to seller X. After receiving the first transaction request, seller X operates its transceiver 14 to activate a secure hotspot with the credentials. The server also transmits a second transaction request with the credentials to buyer X. After receiving the second transaction request, buyer Y operates its transceiver 14 to request a connection to the secure hotspot by use of the password. Seller X accepts the request and tethers buyer Y to WWAN network 40A.

Figure 13:
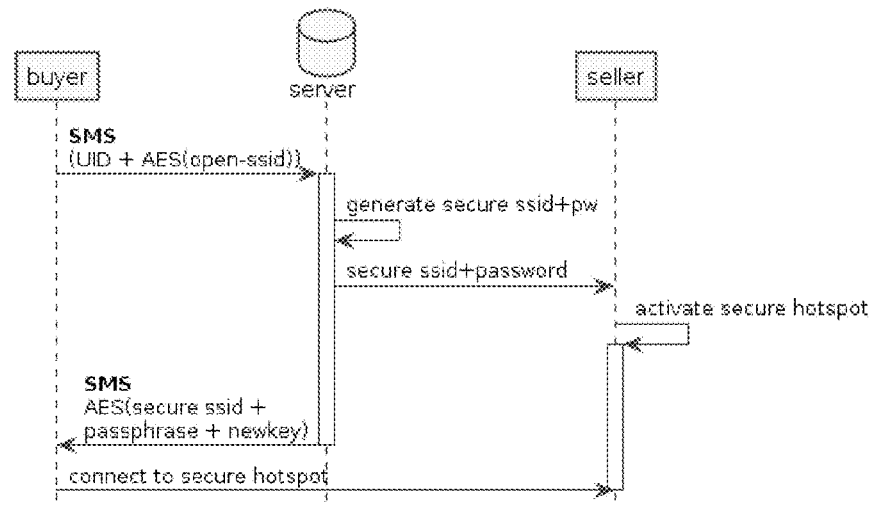

The method in FIG. 13 is an implementation of FIG. 8A. The method presumes that the buyer 10 cannot or will not use the data transfer capacity of its data plan, but that the buyer 10 is able to send text messages (SMS) over the network 40C to the transaction server 30. The method also presumes that there are sellers 20 with activated hotspots that are recognized by the buyer 10 as belonging to the system. The SSIDs of the activated hotspots are known to the server 30 and associated with the respective seller 20 (in database 35). For example, the seller 20 may activate such a hotspot by user selection, e.g. when the user chooses to post an offer (cf. FIG. 11D). The method in FIG. 13 also presumes that the buyer 10 has identified and selected a nearby seller 20. The sequence of steps in FIG. 13 starts by the buyer sending, to the server, an SMS with the SSID of the selected seller. As indicated, the SSID may be encrypted for increased security. In the illustrated example, the SSID is encrypted by AES by use of a current session key that is shared between the buyer and the server. Upon receipt of the SMS, the server retrieves the SSID and identifies the seller based on the SSID. The server then generates credentials for the connection between buyer and seller, including an SSID and a password, and transmits a transaction request with the credentials to the seller. After receiving the transaction request, the seller operates its transceiver 14 to activate a secure hotspot with the credentials. The server also transmits an SMS to the buyer with the credentials. As indicated, the credentials may be encrypted for increased security. The SMS may also include an encrypted new session key (newkey). The buyer retrieves the credentials from the SMS, and replaces the current session key by the new session key, which is thus used in forthcoming encrypted communication with the server. The buyer then operates its transceiver 14 to request a connection to the secure hotspot by use of the password. The seller accepts the request and tethers the buyer to the WWAN network 40A.

Figure 14:
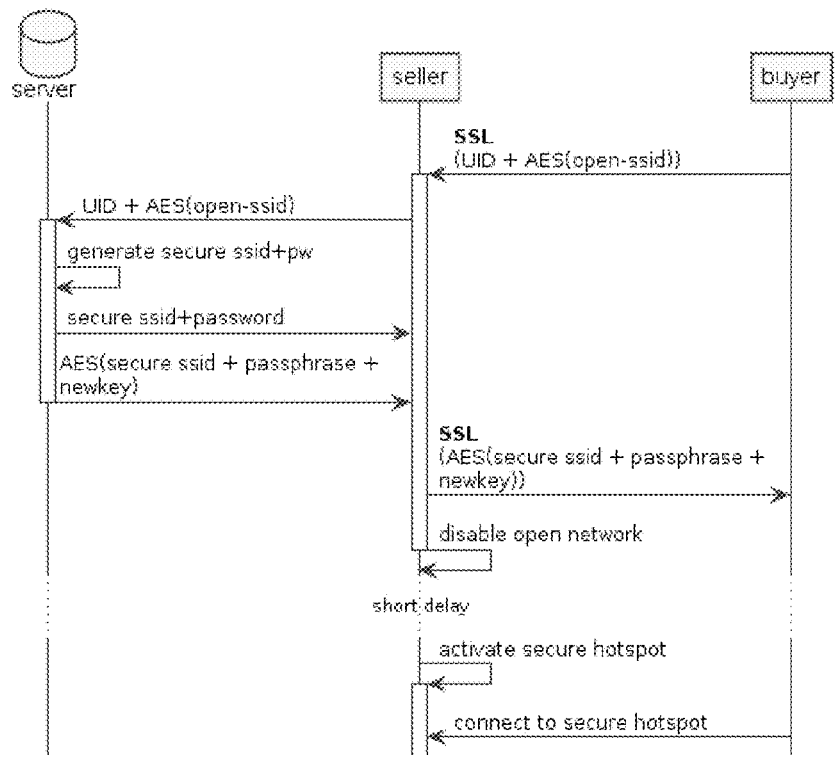

The method in FIG. 14 is an implementation of the process in FIG. 8B. The method presumes that the buyer 10 cannot or will not use the data transfer capacity of its data plan, and that there are sellers 20 with activated open hotspots that are recognized by the buyers 10 as belonging to the system. Like in FIG. 13, the SSIDs of the open hotspots are known to the server 30 and associated with the respective seller 20 (in database 35). The method in FIG. 14 also presumes that the buyer 10 has identified and selected a nearby seller 20, and established a secure connection (e.g. by SSL) to the open hotspot of the selected seller 20. The sequence of steps in FIG. 14 starts by the buyer transmitting, to the selected seller, a request including the SSID of the selected seller. As indicated, the SSID is preferably encrypted for increased security. The seller then transmits the encrypted SSID to the server, which retrieves the SSID to identify the seller. The server then generates credentials for the connection between buyer and seller, including an SSID and a password, and transmits a first response message with the credentials to the seller. The server also generates a second response message with encrypted credentials. As indicated, the second response message may also include a new session key (newkey). The seller forwards the second response message to the buyer and disables the open hotspot. After a short delay, the seller operates its transceiver 14 to activate a secure hotpot with the credentials in the first response message. The buyer decrypts and retrieves the credentials and, optionally, the new session key from the second response message. The buyer then operates its transceiver 14 to request a connection to the secure hotspot by use of the password. The seller accepts the request and tethers the buyer to the WWAN network 40A. If a new session key is received, the buyer replaces the current session key by the new session key.

Figure 15:
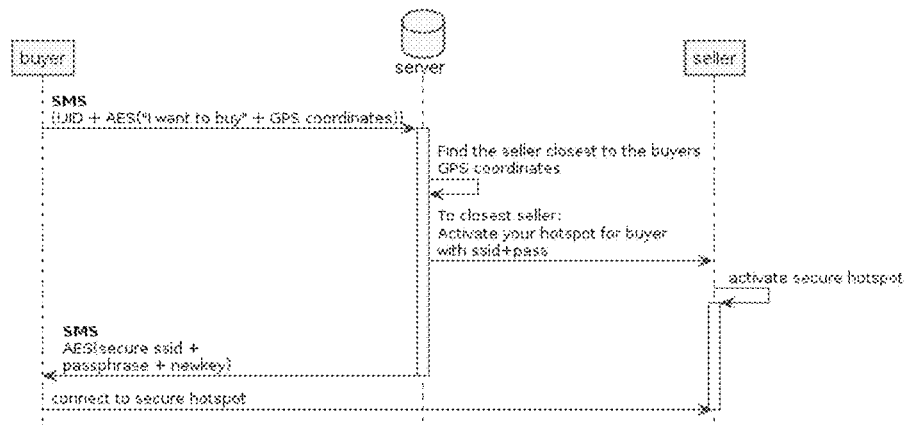

The method in FIG. 15 is an implementation of the process in FIG. 8D. The method presumes that the buyer 10 cannot or will not use the data transfer capacity of its data plan, but that the buyer 10 is able to send text messages (SMS) over the network 40C to the transaction server 30. The method also presumes that the buyer is unable to find any nearby sellers 20 with activated hotspots that belong to the system. The sequence of steps in FIG. 15 starts by the buyer sending, to the server, an SMS including a request for data transfer capacity, and location data for the buyer, in this example its GPS coordinates. As indicated, the location data and the request may be encrypted for increased security. Upon receipt of the SMS, the server searches the database 35 based on the location data and selects the seller that is deemed to be closest to the buyer. If this seller is deemed to be too far from the buyer, the server may send an SMS to the buyer indicating that no connection can be established. Otherwise, the server generates credentials for the connection between buyer and seller, and transmits a transaction request with the credentials to the seller. After receiving the transaction request, the seller operates its transceiver 14 to activate a secure hotspot with the credentials. The server also transmits an SMS to the buyer with the credentials. As indicated, the credentials may be encrypted for increased security. The SMS may also include an encrypted new session key (newkey). The buyer retrieves the credentials from the SMS, and replaces the current session key by the new session key. The buyer then operates its transceiver 14 to request a connection to the secure hotspot by use of the credentials. The seller accepts the request and tethers the buyer to the WWAN network 40A.

Figure 16:
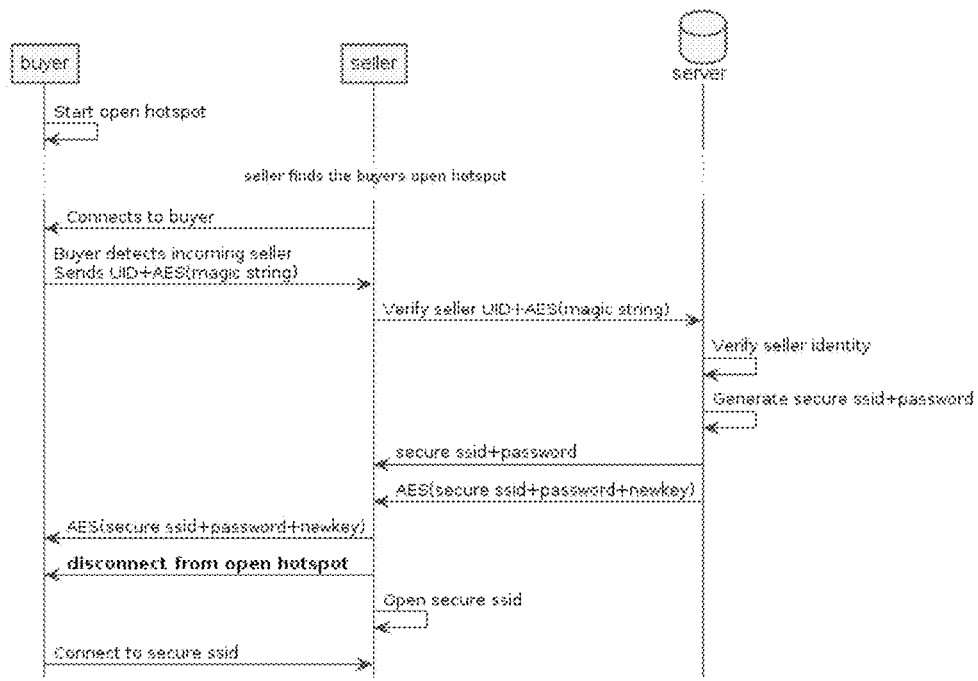

The method in FIG. 16 is an implementation of the processes in FIG. 6G, FIG. 7B and FIG. 8B. The method presumes that the sellers in the system are configured to operate their transceivers 14 to search for open hotspots belonging to the system. The sequence of steps in FIG. 16 starts by the buyer operating its transceiver 14 to activate an open hotspot with a unique SSID that is recognized by the sellers as belonging to the system. The seller detects the buyer's open hotspot as belonging to the system and connects to the open hotspot. Although not shown in FIG. 16, the seller transmits a request with a unique identifier, denoted "magic string" in FIG. 16, to the buyer. The magic string is shared between the seller and the server. The request may also include a connection offer from the seller. It should be realized that the buyer may receive connection offers from more than one seller, and that the buyer may select one seller based on the connection offers. Alternatively or additionally, the buyer may select seller based on other criteria, such as signal strength. The buyer then encrypts the magic string and transmits the encrypted magic string to the seller, which includes this data in a verification request to the server. The server decrypts the magic string and checks if the magic string matches the seller. If the seller is verified, the server generates credentials for the connection between buyer and seller, including an SSID and a password, and transmits a first transaction request with the credentials to the seller. The server also generates a second transaction request with encrypted credentials. As indicated, the second transaction request may also include a new session key (newkey). The seller forwards the second transaction request to the buyer together with an instruction to disable the open hotspot. The seller then operates its transceiver 14 to activate a secure hotpot with the credentials in the first transaction request. The buyer decrypts and retrieves the credentials and, optionally, the new session key from the second transaction request. The buyer then operates its transceiver 14 to request a connection to the secure hotspot by use of the credentials. The seller accepts the request and tethers the buyer to the WWAN network 40A. If a new session key is received, the buyer replaces the current session key by the new session key.

As understood from the foregoing examples, all traffic between the buyers/sellers and the server may be encrypted, e.g. by use of AES encryption. It should also be realized that the UID is transmitted in the system to allow the server to retrieve a proper encryption key for decrypting the encrypted messages.

It should also be understood that the open hotspots that may be set up by providers during the proximity detection (FIG. 6), when providing offers (FIG. 7) or when distributing credentials (FIG. 8), are activated so as to not allow the acquirers (or any other device) to connect to the WWAN network 40A.

It should be noted that the system may implement more than one of the transaction methods (protocols) in FIGS. 12-16, as well as further combinations of the different variants in FIGS. 6-10. The acquirers 10 (buyers) may be configured to allow the user to choose between different transaction methods and/or to automatically select a transaction method depending on the circumstances, e.g. if the buyer has access to the network 40C, if the transceiver 14 detects any providers 20 (sellers) with open hotspots, etc. In one embodiment, the acquirer 10 is configured select transaction method according to a predefined prioritization order of transaction methods. For example, the transaction methods in FIGS. 12-16 may be prioritized in the following order: FIG. 12→FIG. 14/FIG. 13/FIG. 16→FIG. 15. Thus, the method in FIG. 12 may be the default choice if the acquirer has data transfer capacity in network 40C. If not, the acquirer may either search for nearby providers with open hotspots and proceed according to the method in FIG. 13 or FIG. 14, or set up an open hotspot and proceed according to the method in FIG. 16. If all other methods fail, the acquirer may chose the method in FIG. 15.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, a data processing apparatus. The computer readable medium can be a machine-readable storage device, a machine-readable storage substrate, a memory device, a composition of matter effecting a machine-readable propagated signal, or any combination thereof.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The invention claimed is:

1. A computer-implemented method performed by a software-controlled mobile communication device comprising a transceiver for short-range communication, said method comprising:
   initiating a search for mobile devices that are registered with a transaction service to provide data transfer capacity in a wireless wide area network and that are located within reach of the transceiver for short-range communication, obtaining authentication data for a selected mobile device among one or more of the mobile devices detected by the search, operating the transceiver for short-range communication to establish a connection to the selected mobile device by use of the authentication data and cause the selected mobile device to grant the software-controlled mobile communication device access to the wireless wide area network via the connection; and wherein the authentication data comprises credentials for a secure wireless access point configured by the selected mobile device, and wherein the transceiver is operated to connect to the secure wireless access point, by use of the credentials, to establish the connection to the selected mobile device and cause the selected mobile device to grant the software-controlled mobile communication device access to the wireless wide area network via the connection.

2. The computer-implemented method of claim 1, further comprising: obtaining a result of the search indicating said one or more mobile devices; and identifying the selected mobile device by selection among the one or more mobile devices.

3. The computer-implemented method of claim 2, further comprising: measuring a signal strength at the transceiver with respect to each of the one or more mobile devices, and identifying the selected mobile device by selection among the one or more mobile devices as a function of the signal strength.

4. The computer-implemented method of claim 1, further comprising: receiving a connection offer for the one or more mobile devices, the connection offer comprising, for each of the one or more mobile devices, at least one of: an available amount of data transfer capacity and a cost for the available amount of data transfer capacity.

5. The computer-implemented method of claim 1, further comprising: transmitting a connection request to a transaction server to communicate the authentication data to the mobile communication device and the selected mobile device and to cause the selected mobile device to activate the secure wireless access point, and receiving the authentication data.

6. The computer-implemented method of claim 5, wherein the mobile communication device further comprises a transceiver for wireless wide area network communication, said method further comprising: operating the transceiver for wireless wide area network communication to transmit the connection request and receive the authentication data.

7. The computer-implemented method of claim 6, wherein the connection request is transmitted as one or more first text messages, and the authentication data is received as one or more second text messages.

8. The computer-implemented method of claim 5, further comprising: operating the transceiver for short-range communication to transmit a first message with the connection request to the selected mobile device for forwarding to the transaction server, which thereby is caused to transmit a second message comprising the authentication data to the selected mobile device for forwarding to the mobile communication device, and operating the transceiver for short-range communication to receive the second message from the selected mobile device.

9. The computer-implemented method of claim 1, wherein the search comprises operating the transceiver for short-range communication to search for mobile devices that have a respective activated wireless access point associated with the transaction service.

10. The computer-implemented method of claim 1, further comprising: tracking an amount of data transferred in the wireless wide area network by the transceiver for short-range communication when connected to the selected mobile device.

11. The computer-implemented method of claim 10, further comprising: reporting the tracked amount of data to a transaction server.

12. The computer-implemented method of claim 10, further comprising: causing the connection to the selected mobile device to be terminated when the tracked amount of data exceeds a limit.

13. The computer-implemented method of claim 1, further comprising: presenting, via a user interface on the mobile communication device, the one or more mobile devices detected by the search for selection via the user interface.

14. The computer-implemented method of claim 13, wherein said presenting further includes presenting, via the user interface on the mobile communication device, one or more of: a signal strength of the respective mobile device as detected by the transceiver for short-range communication, a quality of a connection of the respective mobile device to the wireless wide area network, an available amount of data transfer capacity of the respective mobile device, and a cost for the available amount of data transfer capacity of the respective mobile device.

15. The computer-implemented method of claim 1, wherein the selected mobile device is identified automatically among the one or more mobile devices detected by the search based on a predefined selection mechanism operating on one or more parameters in the group of: a first parameter representative of a signal strength of the respective mobile device as detected by the transceiver for short-range communication, a second parameter representative of a quality of a short-range communication network between the software-controlled mobile communication device and the respective mobile device, a third parameter representative of a quality of a connection of the respective mobile device to the wireless wide area network, a fourth parameter representative of an available amount of data transfer capacity of the respective mobile device, and fifth parameter representative of a cost for the available amount of data transfer capacity of the respective mobile device.

16. The computer-implemented method of claim 15, further comprising enabling, via a user interface on the mobile communication device, a user to define the selection mechanism.

17. A non transitory computer-readable medium comprising program instructions that, when executed by a processor in a mobile communication device, causes the processor to perform the method of claim 1.

18. A computer-implemented method performed by a software-controlled mobile communication device comprising a transceiver for short-range communication, said method comprising:

initiating a search for mobile devices that are registered with a transaction service to provide data transfer capacity in a wireless wide area network and that are located within reach of the transceiver for short-range communication, obtaining authentication data for a selected mobile device among one or more of the mobile devices detected by the search, and operating the transceiver for short-range communication to establish a connection to the selected mobile device by use of the authentication data and cause the selected mobile device to grant the software-controlled mobile communication device access to the wireless wide area network via the connection, wherein the search is initiated by transmission of a search request to a transaction server, the search request being configured to cause the transaction server to detect the one or more mobile devices by mapping a current location of the mobile communication device to current locations of the mobile devices that are registered with the transaction service to provide data transfer capacity in the wireless wide area network.

19. The computer-implemented method of claim 18, further comprising: receiving a search result from the transaction server, the search result indicating the one or more mobile devices that are located within reach of the transceiver for short-range communication.

20. The computer implemented method of claim 19 wherein said method further comprises receiving, for each of the one or more mobile devices, a connection offer including one or more of an available amount of data transfer capacity and a cost for the available amount of data transfer capacity.

21. The computer-implemented method of claim 18, wherein the search request is configured to cause the transaction server to instruct the one or more mobile devices detected by the search to activate a respective temporary wireless access point associated with the transaction service, the method further comprising: searching for wireless access points that are associated with the transaction service and are located within reach of the transceiver for short-range communication.

22. The computer-implemented method of claim 21, further comprising: measuring a signal strength for the respective wireless access point, and determining the selected mobile device as a function of the signal strength of the respective wireless access point.

23. The computer-implemented method of claim 18, wherein the search comprises operating the transceiver for short-range communication to search for mobile devices that have a respective activated wireless access point associated with the transaction service.

24. The computer-implemented method of claim 18, further comprising: tracking an amount of data transferred in the wireless wide area network by the transceiver for short-range communication when connected to the selected mobile device.

25. The computer-implemented method of claim 24, further comprising: reporting the tracked amount of data to a transaction server.

26. The computer-implemented method of claim 24, further comprising: causing the connection to the selected mobile device to be terminated when the tracked amount of data exceeds a limit.

27. The computer-implemented method of claim 18, further comprising: presenting, via a user interface on the mobile communication device, the one or more mobile devices detected by the search for selection via the user interface.

28. The computer-implemented method of claim 18, wherein the selected mobile device is identified automatically among the one or more mobile devices detected by the search based on a predefined selection mechanism operating on one or more parameters in the group of: a first parameter representative of a signal strength of the respective mobile device as detected by the transceiver for short-range communication, a second parameter representative of a quality of a short-range communication network between the software-controlled mobile communication device and the respective mobile device, a third parameter representative of a quality of a connection of the respective mobile device to the wireless wide area network, a fourth parameter representative of an available amount of data transfer capacity of the respective mobile device, and fifth parameter representative of a cost for the available amount of data transfer capacity of the respective mobile device.

29. A non-transitory computer-readable medium comprising program instructions that, when executed by a processor in a mobile communication device, causes the processor to perform the method of claim 18.

* * * * *